US009165589B1

United States Patent
Huang

(10) Patent No.: US 9,165,589 B1
(45) Date of Patent: Oct. 20, 2015

(54) VOICE COIL MOTOR WITH LATERAL ATTRACTION FORCE

(71) Applicant: VASSTEK INTERNATIONAL CORP., Miaoli County (TW)

(72) Inventor: Chih-Ming Huang, New Taipei (TW)

(73) Assignee: VASSTEK INTERNATIONAL CORP., Zhunan Science-Based Industrial Park, Zhunan Township, Miaoli County (TW)

( * ) Notice: Subject to any disclaimer, the term of this patent is extended or adjusted under 35 U.S.C. 154(b) by 0 days.

(21) Appl. No.: 14/672,222

(22) Filed: Mar. 29, 2015

(30) Foreign Application Priority Data

Jan. 14, 2015 (TW) .............................. 104101281 A

(51) Int. Cl.
G11B 7/09 (2006.01)
G02B 15/14 (2006.01)
G11B 7/095 (2006.01)
H02K 41/035 (2006.01)
G02B 7/08 (2006.01)

(52) U.S. Cl.
CPC .............. *G11B 7/0956* (2013.01); *G02B 15/14* (2013.01); *G11B 7/0933* (2013.01); *G11B 7/0935* (2013.01); *G02B 7/08* (2013.01); *H02K 41/0356* (2013.01)

(58) Field of Classification Search
USPC ............ 359/813, 814, 824; 310/12.16, 12.19; 360/264.7; 720/658, 659, 660, 666, 720/672, 681
See application file for complete search history.

(56) References Cited

U.S. PATENT DOCUMENTS

| 5,774,266 | A * | 6/1998 | Otani et al. .................... 359/554 |
|---|---|---|---|
| 6,683,831 | B2 * | 1/2004 | Tanaka et al. .............. 369/44.14 |
| 6,888,689 | B2 * | 5/2005 | Nakamura et al. ............ 359/814 |
| 7,457,057 | B2 * | 11/2008 | Hamatani ..................... 359/814 |
| 7,719,779 | B2 * | 5/2010 | Yamashita ..................... 359/824 |
| 7,760,453 | B2 * | 7/2010 | Kuo et al. ..................... 359/824 |
| 7,986,478 | B2 * | 7/2011 | Yamashita et al. ............ 359/824 |
| 8,040,621 | B2 * | 10/2011 | Chang et al. .................. 359/824 |
| 8,040,763 | B2 * | 10/2011 | Matozaki et al. .......... 369/44.14 |
| 8,274,748 | B1 * | 9/2012 | Chiang ......................... 359/824 |
| 8,295,695 | B2 * | 10/2012 | Yoshida et al. ............... 396/133 |
| 8,368,255 | B2 * | 2/2013 | Park et al. .................. 310/12.16 |
| 8,488,262 | B2 * | 7/2013 | Watanabe et al. ............. 359/824 |
| 8,531,534 | B2 * | 9/2013 | Hu et al. ................... 348/208.11 |
| 8,605,372 | B2 * | 12/2013 | Yu ................................. 359/813 |
| 8,634,150 | B2 * | 1/2014 | Chou ............................. 359/824 |
| 8,638,510 | B2 * | 1/2014 | Lee et al. ...................... 359/824 |
| 8,872,393 | B2 * | 10/2014 | Hou ........................... 310/12.16 |
| 8,929,005 | B2 * | 1/2015 | Park et al. ..................... 359/824 |
| 2003/0147336 | A1 * | 8/2003 | Yoshinaga .................... 369/244 |
| 2007/0166022 | A1 * | 7/2007 | Lai ................................ 396/133 |
| 2008/0095019 | A1 * | 4/2008 | Hatano et al. ............ 369/112.24 |
| 2012/0229925 | A1 * | 9/2012 | Morio et al. .................. 359/824 |

* cited by examiner

Primary Examiner — Brian Miller
(74) Attorney, Agent, or Firm — Winston Hsu; Scott Margo

(57) ABSTRACT

A voice coil motor with a lateral attraction force comprising a magnetic device, a lens carrier, a base, a plurality of guide posts, a set of surface coil and a guiding magnetic plate. The first contact structure and the second contact structure of the magnetic device are contacted the plurality of guide posts respectively. There is at least one contacting point between the first contact structure and one of the plurality of guide posts, and there are at least two contacting point between the second contact structure and the other of the plurality of guide posts.

10 Claims, 10 Drawing Sheets

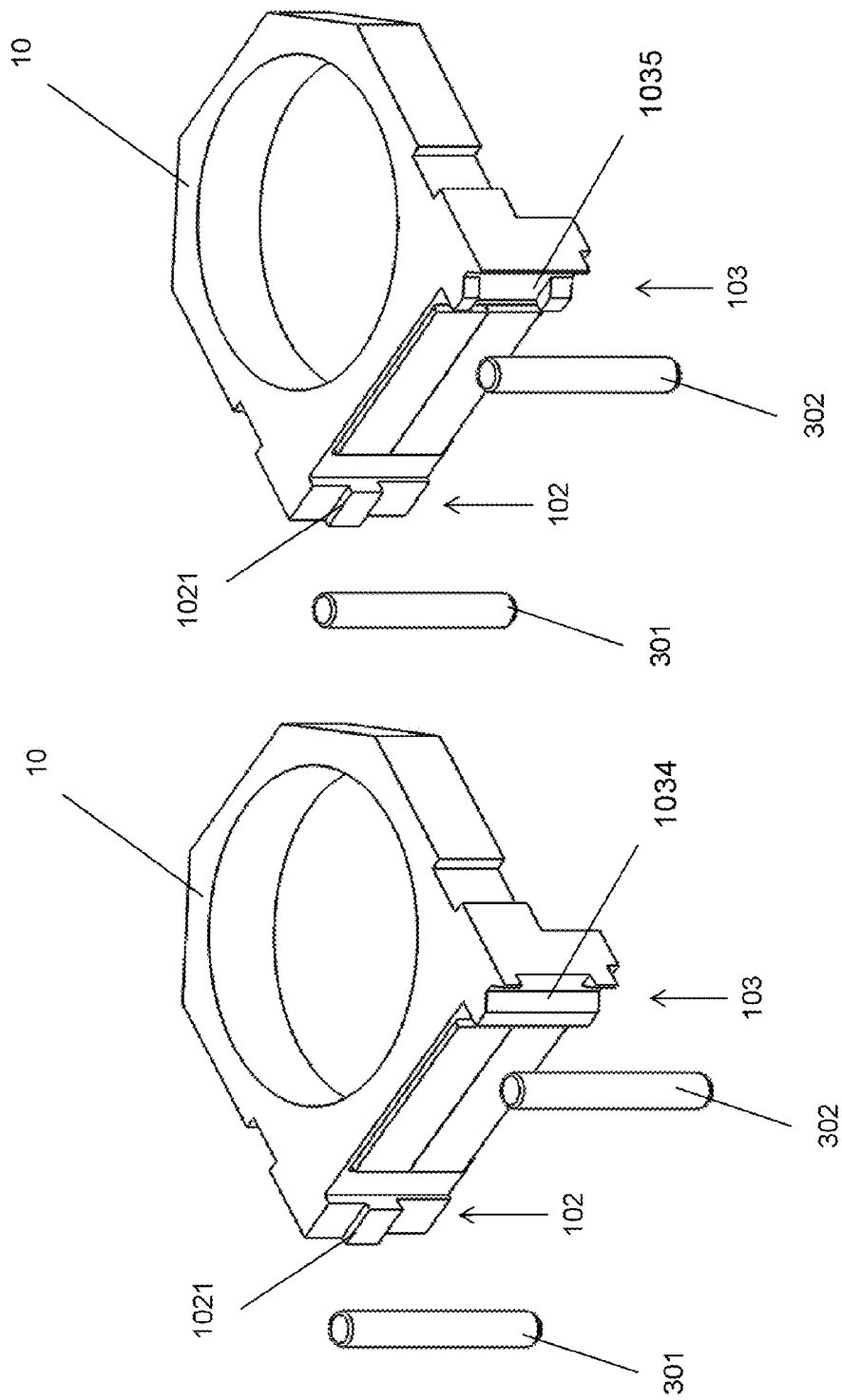

VOICE COIL MOTOR WITH LATERAL ATTRACTION FORCE

BACKGROUND OF THE INVENTION

1. Field of the Invention

The present invention relates to a voice coil motor, and more particularly, to a voice coil motor with a lateral attraction force.

2. Description of the Prior Art

In order to perform a more accurate position control for a set of lenses or an access arm of a hard disk drive, a voice coil motor (VCM) is adopted to move the set of lenses or the access arm of the hard disk drive. The structure of a VCM is primarily a coil placed within a magnetic circuit including a permanent magnet.

In an optical system employing a VCM, there is an interaction propelling force between the coil and the permanent magnet according to Fleming's left-hand rule that moves a carrier physically connected to the permanent magnet when a current flows through the coil; at the same time, a set of lenses which is attached to the carrier is moved correspondingly, so as to achieve optical zoom and focus functionalities. Based on applying a specific current value through the coil, an accurate control for optical zooming and focusing can be achieved.

In an optical system employing a VCM, the attractive force in a lateral direction between a magnetic device and a plurality of guide posts of the VCM causes friction force between a lens carrier and a plurality of guide posts. The added friction force is sufficient to maintain the lens carrier and other devices thereon at a specific position without applying the current to a coil. For example, Taiwanese Patent Application No. 1400861, entitled "VOICE COIL MOTOR APPARATUS WITH STABLE MOVING", as shown in FIG. 6A~6B, the voice coil motor comprises the lens carrier 80 (mainly constructed by a set of magnetic sensing elements), the guide posts 801 and 802 and electromagnetic drive mechanism (mainly constructed by the coil) on the base 200. After the lens carrier 80 is equipped with the base 200, the guide posts 801 and 802 fixed on the base 200 contacts against the opening structure 701 and 702 of the lens carrier 80.

Based on the attraction force of the set of magnetic sensing elements, the guide posts 801 and 802 fixed on the base 200 contacts against the opening structure 701 and 702 of the lens carrier 80 and the lens carrier 80 is rotated along the R direction. Based on rotation of the lens carrier 80, there is at least one contacting line C6 between opening structure 702 and the guide posts 802, and there are at least two contacting line C4 and C5 between opening structure 701 and the guide posts 801.

A flatness requirement of the opening structure 701 and 702 of the lens carrier 80 is higher for maintaining the contacting line C4, C5 and C6 in a straight line and stable moving of the lens carrier 80. However, A flatness requirement of the opening structure 701 and 702 of the lens carrier 80 is too hard to be successfully produced in quantity.

SUMMARY OF THE INVENTION

One of the primary objectives of the present invention is to form a the lateral attraction force between the guiding magnetic plate and the set of magnetic sensing elements, which the first contact structure and the second contact structure of the magnetic device are contacted the plurality of guide posts respectively, thereby avoiding rotation of the magnetic device along a determine direction and reducing a flatness requirement of the first contact structure and the second contact structure.

To realize the objectives mentioned above, the present invention provides a voice coil motor with a lateral attraction force. A voice coil motor with a lateral attraction force comprising a magnetic device, a lens carrier, a base, a plurality of guide posts, a set of surface coil and a guiding magnetic plate. A magnetic device has a set of magnetic sensing elements, and comprises a first contact structure and a second contact structure on a contact surface. A lens carrier is coupled to the magnetic device via a rigid connection for carrying a lens. A plurality of guide posts is fixed on the base for contacting the first contact structure and the second contact structure respectively based on a position of the plurality of guide posts on the base. The set of surface coil is formed by a patterned metal layer on the set of printed circuit boards and facing the set of magnetic sensing elements respectively. A first distance exists between the set of surface coil and the set of magnetic sensing elements. A guiding magnetic plate is configured to face the set of magnetic sensing elements respectively. A second distance exists between the guiding magnetic plate and the set of magnetic sensing elements. The guiding magnetic plate is faced the set of magnetic sensing elements to generates the lateral attraction force between the guiding magnetic plate and the set of magnetic sensing elements, so that the first contact structure and the second contact structure of the magnetic device are contacted the plurality of guide posts respectively. There is at least one contacting point between the first contact structure and one of the plurality of guide posts, and there are at least two contacting point between the second contact structure and the other of the plurality of guide posts.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5A~5D is a diagram of a magnetic device according to the present invention.

DETAILED DESCRIPTION

The following further describes the present invention in detail in conjunction with various figures and embodiments.

Figure 1A:
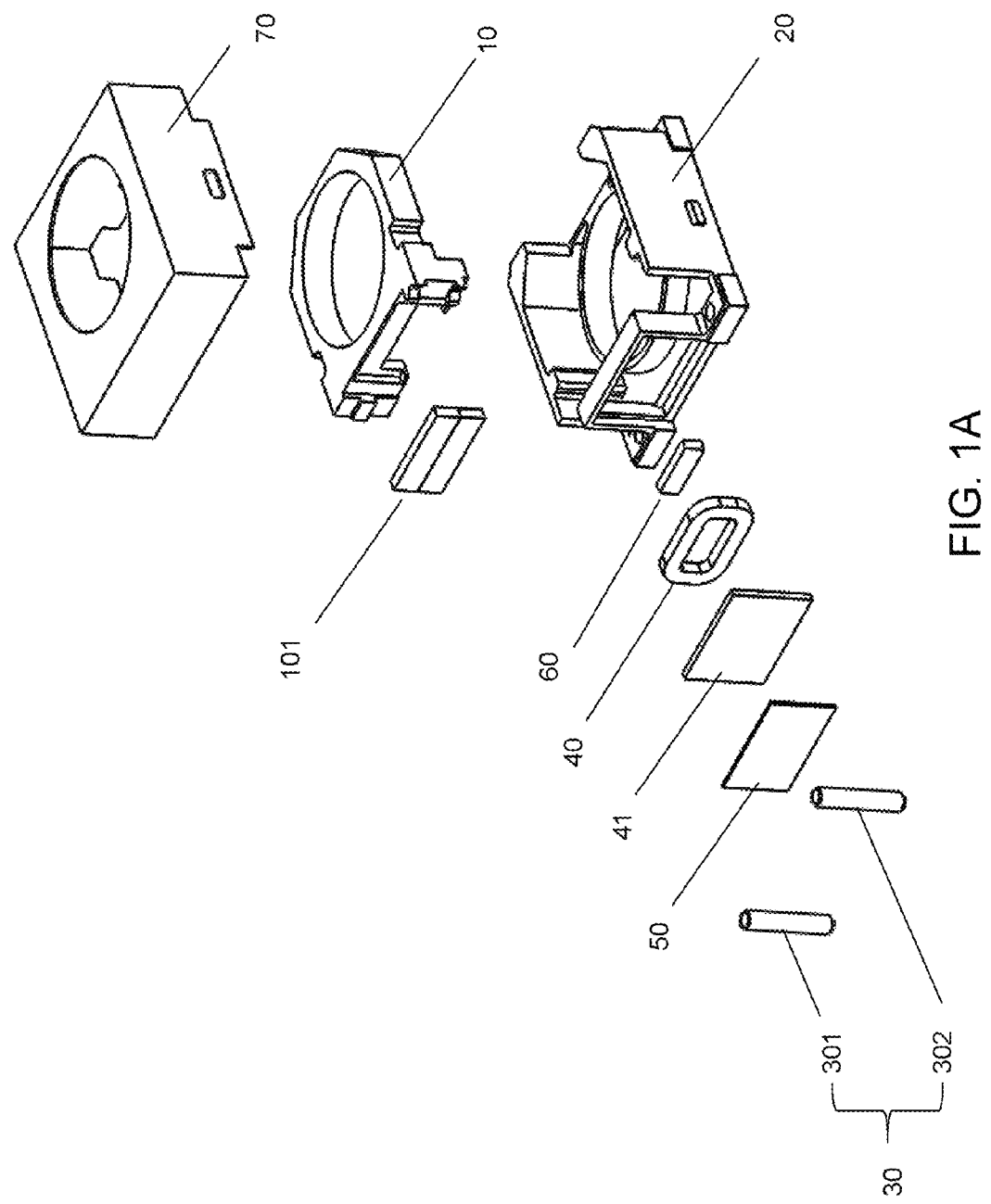
FIG. 1A~1B is a diagram of a VCM according to the present invention
Figure 1B:
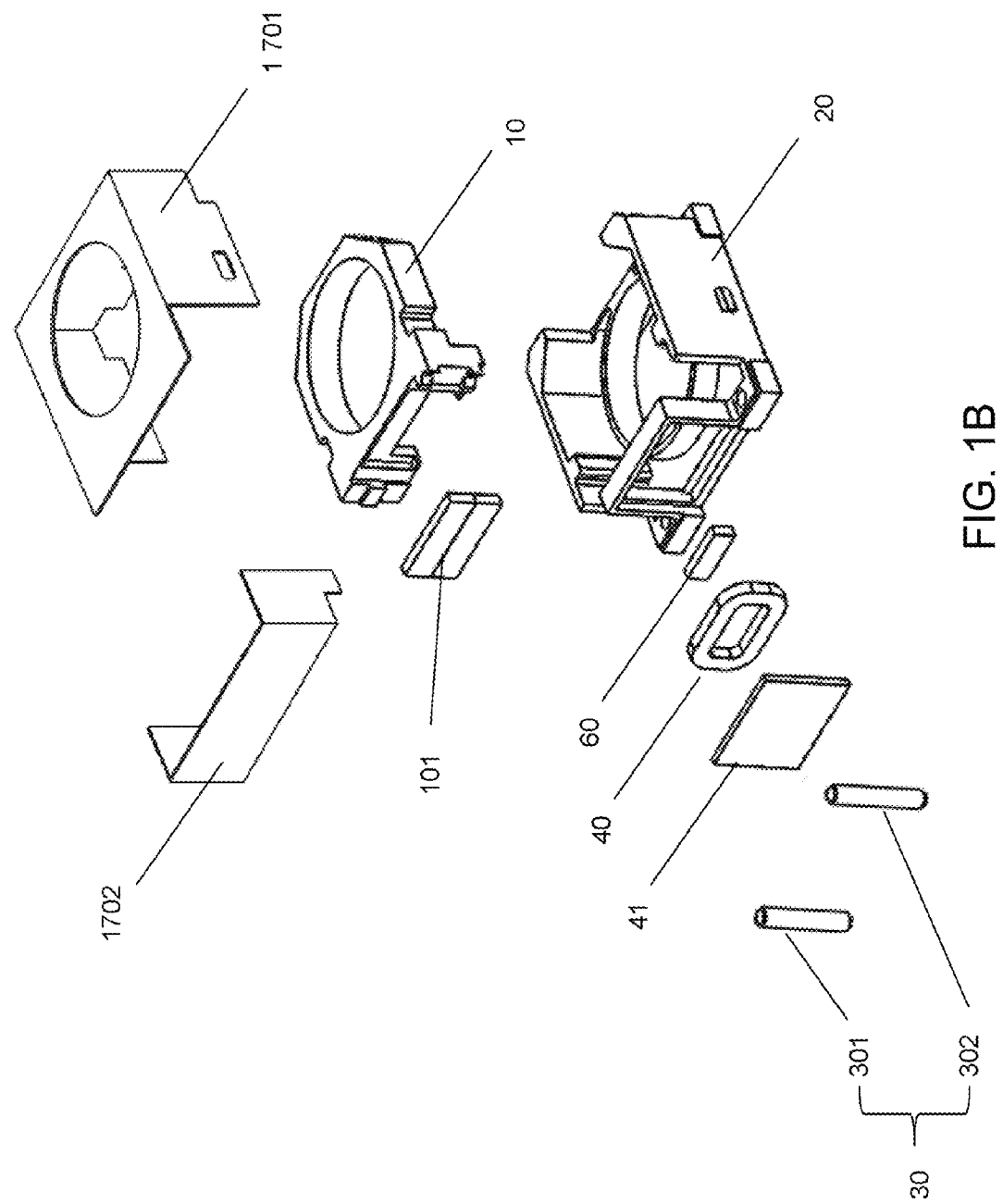

Please refer to FIG. 1A-1B, which is a diagram of a VCM according to the present invention. As shown in FIG. 1A-1B, a VCM with a lateral attraction force includes a magnetic device 10 having a set of magnetic sensing elements 101, a lens carrier (not shown), a base 20, a plurality of guide posts 30 fixed on the base 20, a set of surface coil 40 and a guiding magnetic plate 50 which is configured to face the set of magnetic sensing elements 101.

A lens carrier is coupled to the magnetic device 10 via a rigid connection for carrying a lens. The set of surface coil 40 is formed by a patterned metal layer on the set of printed circuit boards 41 and facing the set of magnetic sensing elements 101 respectively. A first distance exists between the set of surface coil 40 and the set of magnetic sensing elements 101. A second distance exists between the guiding magnetic plate 50 and the set of magnetic sensing elements 101. A third distance exists between the plurality of guide posts 30 and the set of magnetic sensing elements 101. A position feedback sensor 60 to measure relative displacement of the magnetic device 10 so as to achieve optical zoom and focus functionalities.

As shown in FIG. 1A, the guiding magnetic plate 50 is a shell 70 of voice coil motor or as shown in FIG. 1B, the guiding magnetic plate 50 is the shell 1702 of the combination of the shell 1701 and 1702, which is configured to face the set of magnetic sensing elements 101.

Figure 2A:
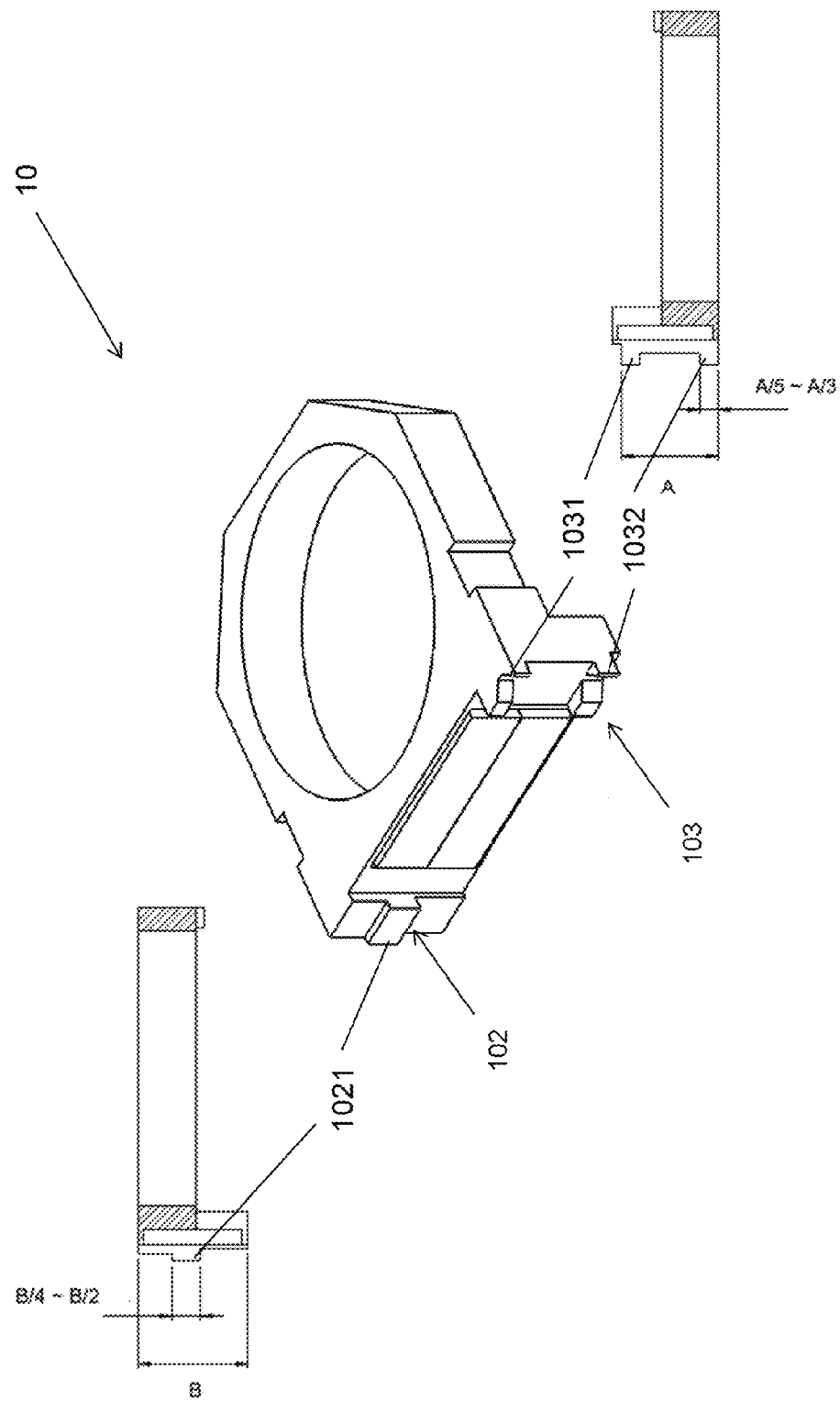
FIG. 2A~2B is a diagram of a magnetic device according to the present invention.
Figure 2B:
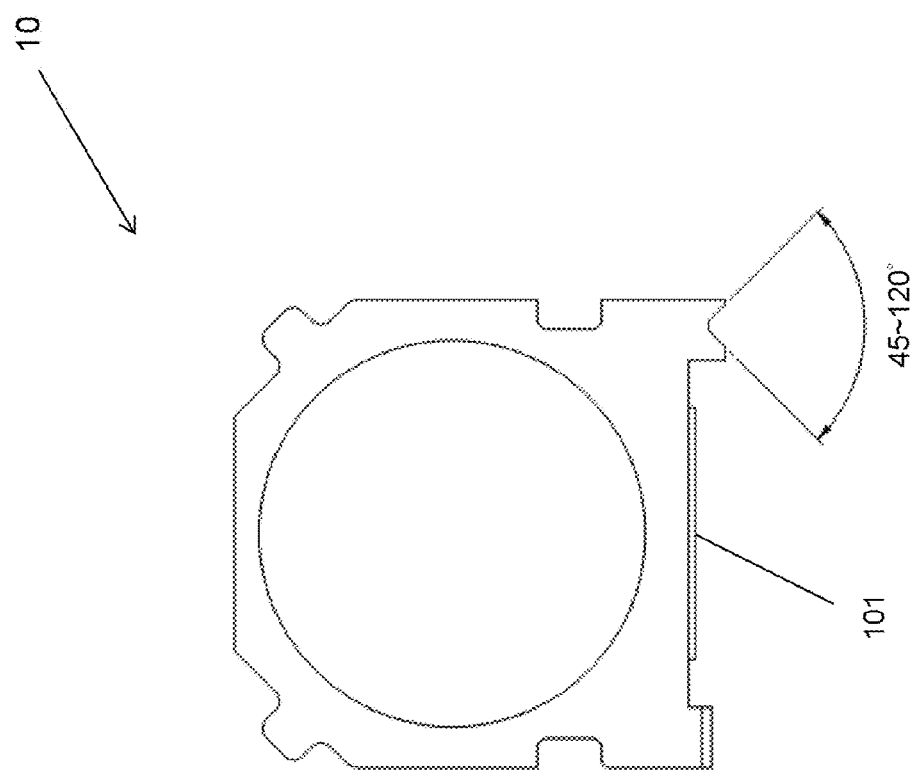

Please refer to FIG. 2A-2B, which is a diagram of a magnetic device according to the present invention. As shown in FIG. 2A-2B, a magnetic device 10 comprises a first contact structure 102 and a second contact structure 103 on a contact surface. To achieve the optical zooming and focus, when the set of printed circuit boards 41 is fixed onto the base 20, the set of surface coil 40 is configured to face the set of the magnetic sensing element 101 such that an interaction between the set of surface coil 40 and a main magnetic flux provided by the set of magnetic sensing elements 101 makes the lens carrier and the lens thereof move in a straight line along a direction of the guide posts 301 and 302 contacted the first contact structure 102 and the second contact structure 103 respectively based on a position of the plurality of guide posts 30 on the base 20.

As shown in FIG. 2A, the first contact structure 102 is a substantially planar surface 1021 with a micro-protruding structure so that there is at least one contacting line formed by a plurality of contacting point between the first contact structure 102 and the guide posts 301. A short side length of the substantially planar surface 1021 is from one half to one fourth of a vertical side length of the contact surface B. In other words, The substantially planar surface 1021 with a micro-protruding structure is not too big so as to reduce the attractive force between the guide posts 301 and the first contact structure 102.

As shown in FIG. 2A, the second contact structure 103 is a V shaped opening groove so that there is at least two contacting line formed by at least two of a plurality of contacting point between the second contact structure 103 and the guide posts 302. The second contact structure 103 maybe a non-continuous V shaped opening groove so that there is at least two contacting line formed by at least two of a plurality of continuous contacting point or at least two contacting point formed by at least two of a plurality of non-continuous contacting point between the second contact structure 103 and the guide posts 302.

Based on a plurality of non-continuous contacting point between the second contact structure 103 and the guide posts 302, the second contact structure 302 is separated into two the set of continuous contacting point defined by a first contact substructure 1031 and a second contact substructure 1032. A short side length of the first contact substructure 1031 or the second contact substructure 1032 is from one third to one fifth of a vertical side length of the contact surface A along a direction horizontal to a contacting line formed between the first contact substructure 1031 or the second contact substructure 1032. Two side of the V shaped opening groove are arranged to form a contacting angle from 45 degrees to 120 degrees as shown in FIG. 2B.

To avoid rotation of the magnetic device 10 along a determine direction and reducing a flatness requirement of the first contact structure 102 and the second contact structure 103, a voice coil motor provides the lateral attraction force between the guiding magnetic plate 50 and the set of magnetic sensing elements 101, which the first contact structure 102 and the second contact structure 103 of the magnetic device 10 are contacted the plurality of guide posts 30 respectively.

Since the guiding magnetic plate 50 is faced the set of magnetic sensing elements 101, It generates the lateral attraction force between the guiding magnetic plate 50 and the set of magnetic sensing elements 101, so that movable the magnetic device 10 be moved and the first contact structure 102 and the second contact structure 103 of the magnetic device 10 are contacted the plurality of guide posts 30 respectively so as to limit the moving range of the magnetic device 10.

Figure 3:
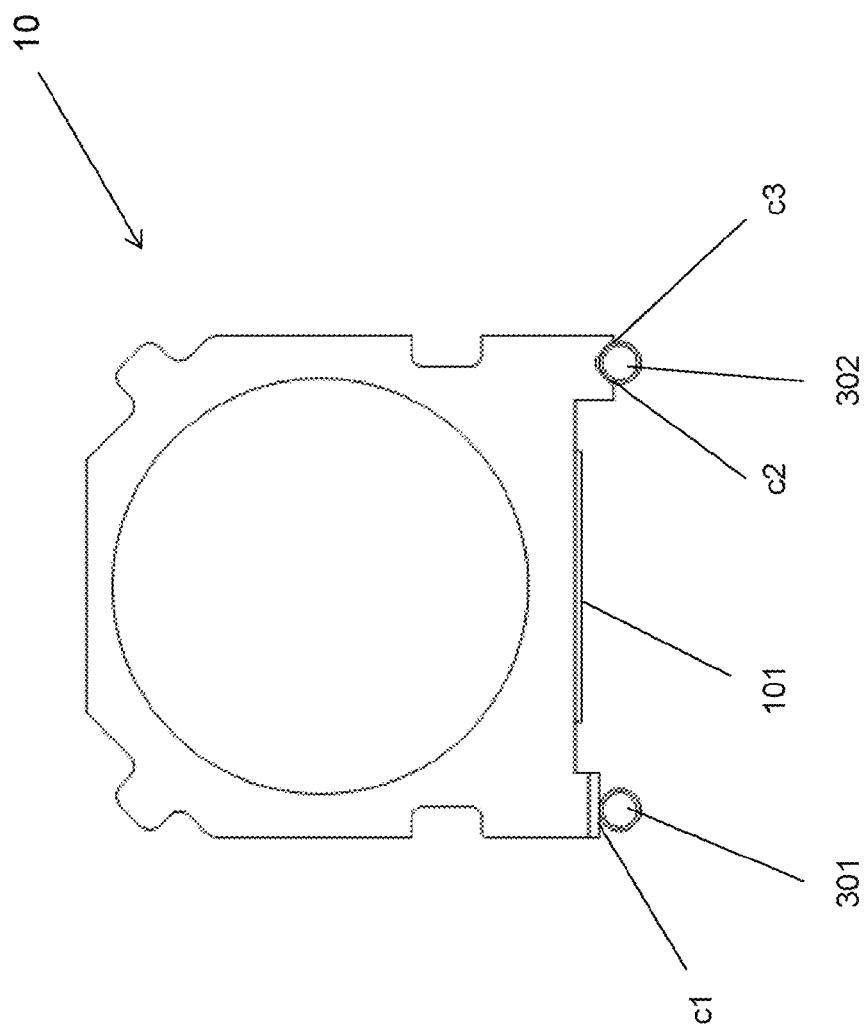
FIG. 3 is a diagram of a magnetic device and a plurality of guide posts according to the present invention.

Please refer to FIG. 3, which is a diagram of a magnetic device and a plurality of guide posts according to the present invention. As shown in FIG. 3, there is at least one contacting line C1 formed by a plurality of contacting point between the first contact structure 102 and the guide posts 301. There is at least two contacting line C2 and C3 formed by at least two of a plurality of contacting point between the second contact structure 103 and the guide posts 302. The guide posts 302 forming at least two contacting line C2 and C3 is a master guide posts and The guide posts 301 forming a contacting line C1 is a slave guide posts.

Figure 4:
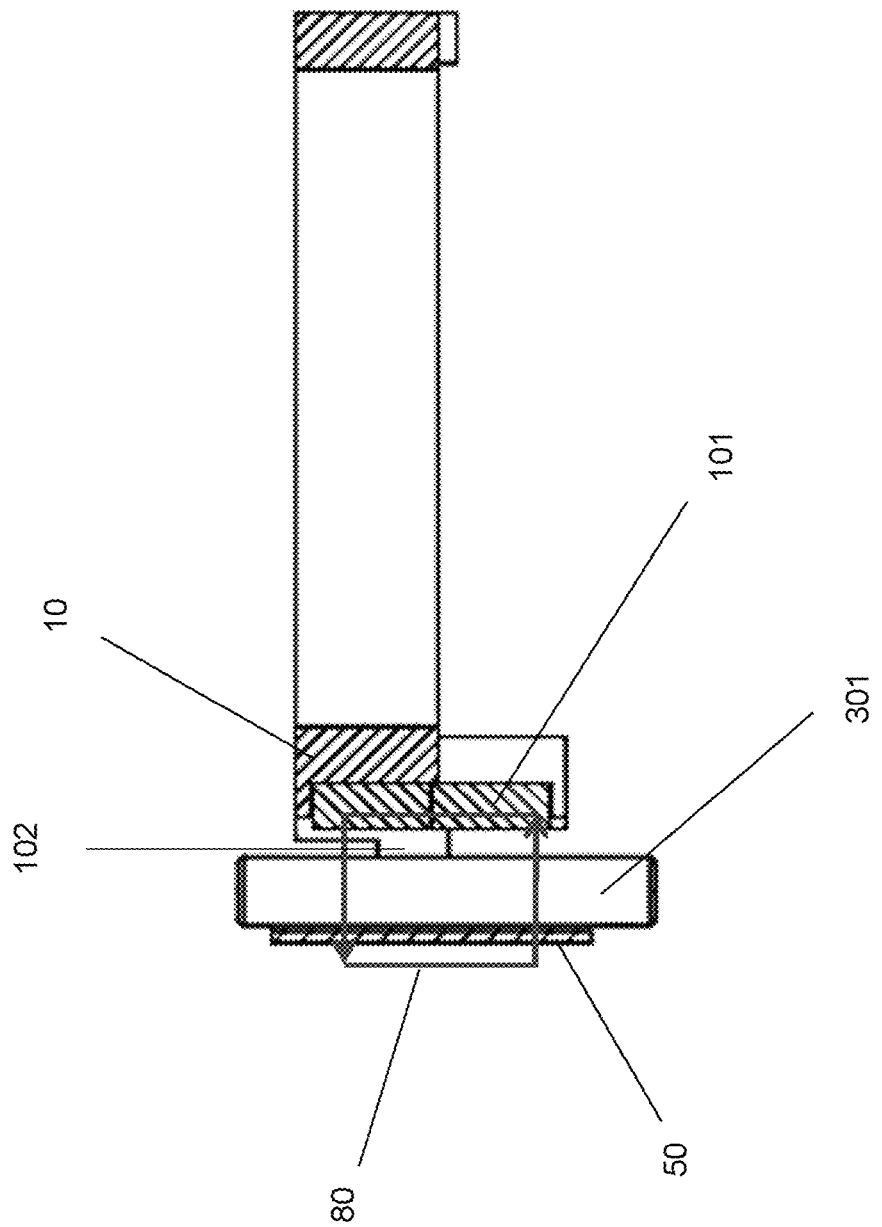
FIG. 4 is a diagram of a magnetic path according to the present invention.

Please refer to FIG. 4, which is a diagram of a magnetic path according to the present invention. As shown in FIG. 4, the set of magnetic sensing elements 101, the guide posts 301 and the guiding magnetic plate 50 form the magnetic path 80.

For the first contact structure 102 and the guide posts 301, numerous modifications can be made. The first contact structure 102 has to form at least one contacting line or point and the guide posts 301 has to form at least two contacting line or point.

Figure 5A:
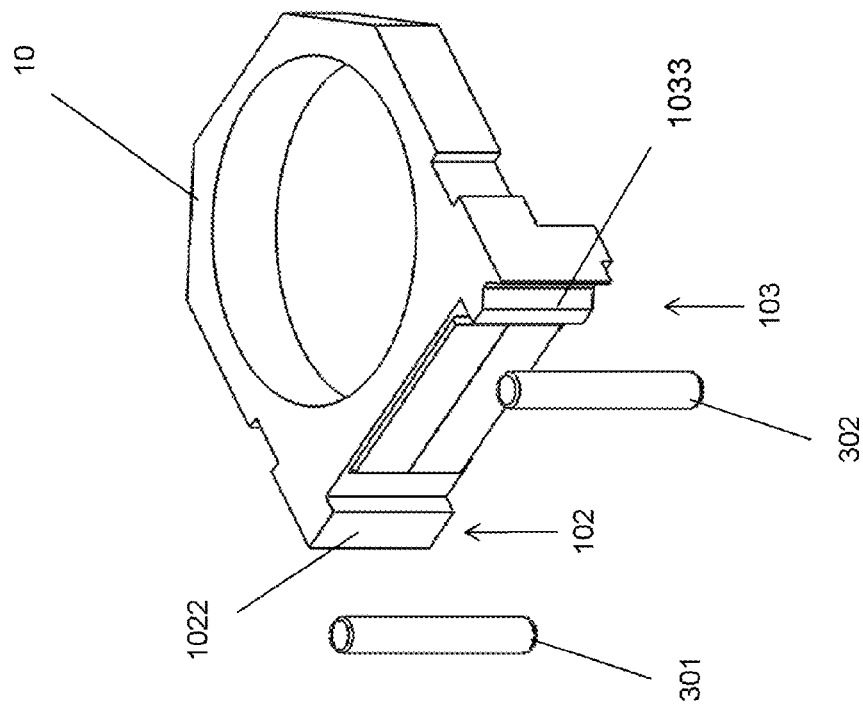
Figure 5B:
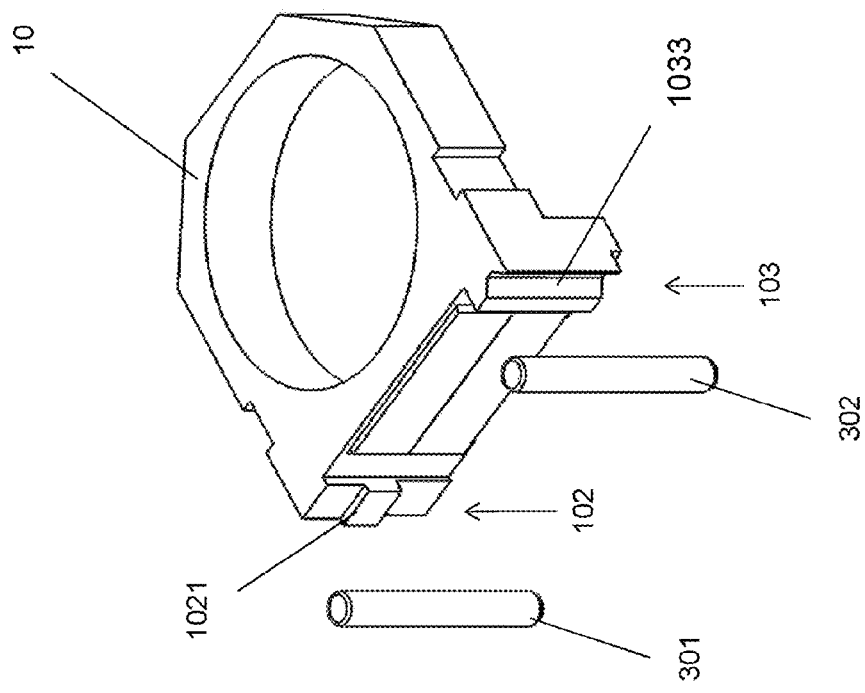
Figure 6A:
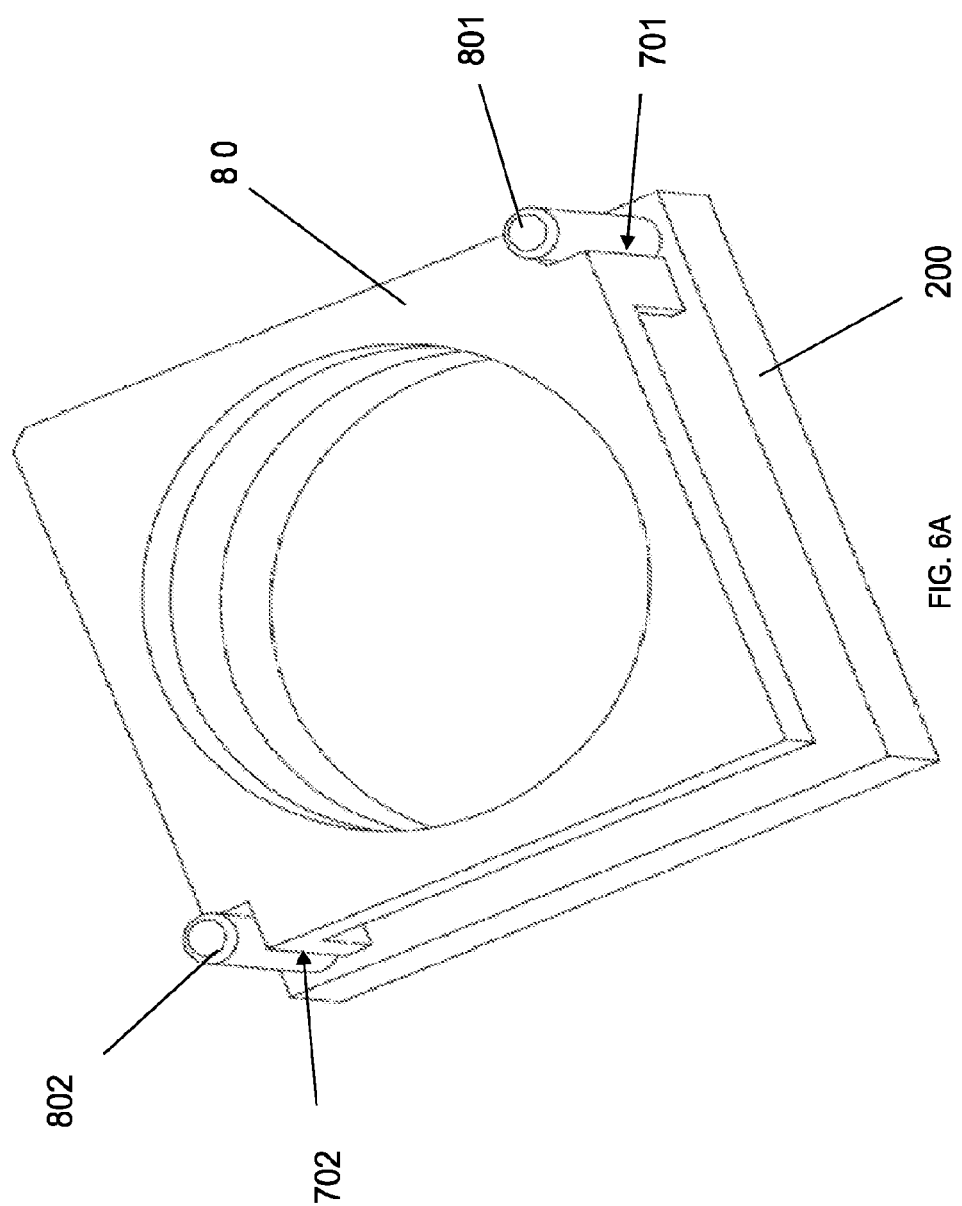
FIG. 6A~6B is a diagram of a VCM according to the Prior Art.
Figure 6B:
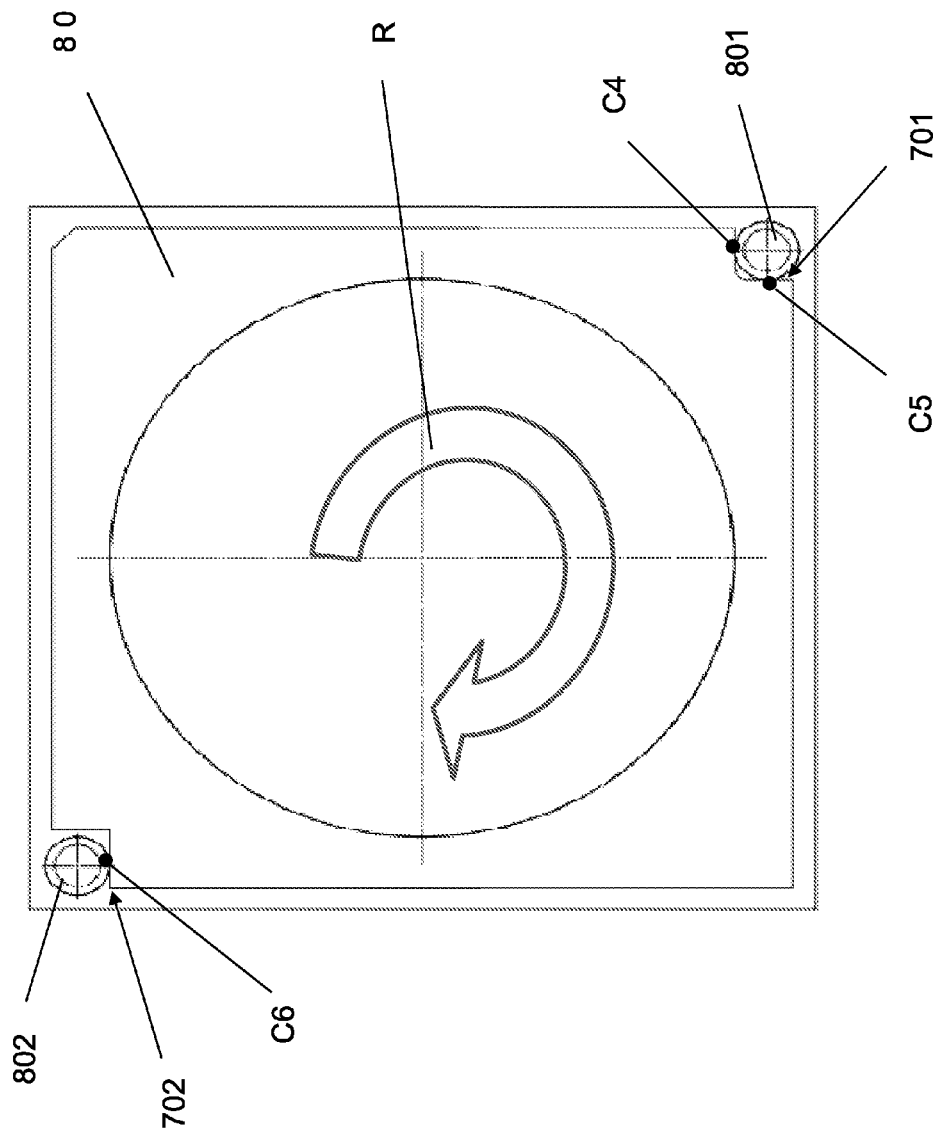

Please refer to FIG. 5A~5D, which is a diagram of a magnetic device according to the present invention. As shown in FIG. 5A, the second contact structure 103 is a V shaped opening groove 1033 which is at least two contacting line formed by at least two of a plurality of contacting point. As shown in FIG. 5B, the first contact structure 102 is a substantially planar surface 1022 which there is at least one contacting line formed by a plurality of contacting point. As shown in FIG. 5C~5D, the second contact structure 103 is a non-continuous V shaped opening groove 1034 or 1035 which there is at least two contacting line formed by at least two of a plurality of continuous contacting point or at least two contacting point formed by at least two of a plurality of non-continuous contacting point between the second contact structure and the other of the plurality of guide posts.

Those skilled in the art will readily observe that numerous modifications and alterations of the device and method may be made while retaining the teachings of the invention.

What is claimed is:

1. A voice coil motor with a lateral attraction force, comprising:
   a magnetic device, having a set of magnetic sensing elements, and comprising a first contact structure and a second contact structure on a contact surface;
   a lens carrier, coupled to the magnetic device via a rigid connection, for carrying a lens;
   a base;
   a plurality of guide posts, fixed on the base for contacting the first contact structure and the second contact structure respectively based on a position of the plurality of guide posts on the base;

a set of surface coil, formed by a patterned metal layer on a set of printed circuit boards and facing the set of magnetic sensing elements respectively, wherein a first distance exists between the set of surface coil and the set of magnetic sensing elements;

a guiding magnetic plate, configured to face the set of magnetic sensing elements respectively, wherein a second distance exists between the guiding magnetic plate and the set of magnetic sensing elements;

wherein, the guiding magnetic plate facing the set of magnetic sensing elements generates the lateral attraction force between the guiding magnetic plate and the set of magnetic sensing elements, so that the first contact structure and the second contact structure of the magnetic device are contacted the plurality of guide posts respectively, and wherein there is at least one contacting point between the first contact structure and one of the plurality of guide posts, and there are at least two contacting points between the second contact structure and the other of the plurality of guide posts.

2. The voice coil motor of claim 1, wherein the first contact structure is a substantially planar surface so that there is at least one contacting line formed by a plurality of contacting points between the first contact structure and one of the plurality of guide posts.

3. The voice coil motor of claim 2, wherein a short side length of the substantially planar surface is from one half to one fourth of a vertical side length of the contact surface.

4. The voice coil motor of claim 1, wherein the second contact structure is a V shaped opening groove so that there is at least two of a plurality of contacting lines formed by at least two of a plurality of contacting points between the second contact structure and the other of the plurality of guide posts.

5. The voice coil motor of claim 1, wherein the second contact structure is a non-continuous V shaped opening groove so that there is at least two of a plurality of contacting lines formed by at least two of a plurality of continuous contacting points or at least two contacting points formed by at least two of a plurality of non-continuous contacting points between the second contact structure and the other of the plurality of guide posts.

6. The voice coil motor of claim 5, wherein based on a plurality of non-continuous contacting points between the second contact structure and the other of the plurality of guide posts, the second contact structure is separated into two sets of a plurality of continuous contacting points defined as a first contact substructure and a second contact substructure.

7. The voice coil motor of claim 6, wherein a short side length of the first contact substructure or the second contact substructure is from one third to one fifth of a vertical side length of the contact surface along a direction horizontal to a contacting line formed between the first contact substructure or the second contact substructure.

8. The voice coil motor of claim 4, wherein two side of the V shaped opening groove are arranged to form a contacting angle from 45 degrees to 120 degrees.

9. The voice coil motor of claim 1, wherein the guiding magnetic plate is a shell of voice coil motor or a part of the shell.

10. The voice coil motor of claim 1, further comprising a position feedback sensor to measure relative displacement of the magnetic device.

* * * * *